United States Patent
Duanmu et al.

(10) Patent No.: US 10,972,753 B1
(45) Date of Patent: Apr. 6, 2021

(54) VERSATILE TILE CODING FOR MULTI-VIEW VIDEO STREAMING

(71) Applicant: Apple Inc., Cupertino, CA (US)

(72) Inventors: Fanyi Duanmu, Cupertino, CA (US); Eduardo Asbun, Cupertino, CA (US); Xiaosong Zhou, Campell, CA (US); Jun Xin, Sunnyvale, CA (US); Hsi-Jung Wu, San Jose, CA (US); John Su, Sunnyvale, CA (US); Samir Gehani, Cupertino, CA (US); Christopher Flick, San Jose, CA (US); Shalini Sahoo, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/569,725

(22) Filed: Sep. 13, 2019

(51) Int. Cl.
*H04N 19/597* (2014.01)
*H04N 19/187* (2014.01)
*H04N 19/176* (2014.01)

(52) U.S. Cl.
CPC ......... *H04N 19/597* (2014.11); *H04N 19/176* (2014.11); *H04N 19/187* (2014.11)

(58) Field of Classification Search
CPC combination set(s) only.
See application file for complete search history.

(56) References Cited

U.S. PATENT DOCUMENTS

| | | |
|---|---|---|
| 6,331,869 B1 | 12/2001 | Furlan et al. |
| 2016/0165309 A1* | 6/2016 | Van Brandenburg ........ H04N 21/4728 725/116 |
| 2017/0118540 A1 | 4/2017 | Thomas et al. |
| 2017/0251204 A1 | 8/2017 | Gupte et al. |
| 2017/0324951 A1 | 11/2017 | Raveendran et al. |

FOREIGN PATENT DOCUMENTS

EP 1162830 A2 12/2001

OTHER PUBLICATIONS

Y. Wang et al., "Tile Based VR video Encoding and Decoding Schemes", Joint Collaborative Team on Video Coding (JCT-VC) of ITU-T SG 16 WP 3 and ISO/IEC JTC 1/SC 29/WG 11, 24th Meeting: Geneva, CH, May 26-Jun. 1, 2016, pp. 1-6.

* cited by examiner

*Primary Examiner* — Nam D Pham
(74) *Attorney, Agent, or Firm* — BakerHostetler

(57) ABSTRACT

Techniques are disclosed for coding and delivering multi-view video in which the video is represented as a manifest file identifying a plurality of segments of the video available for download. The multi-view video may be partitioned spatially into a plurality of tiles that, in aggregate, encompass the entire spatial area of the video. The tiles are coded as segments contains coded video representing content contained within its respective tile. Tiles may be given different sizes based on saliency of the content within their respective regions. In this manner, tiles with high levels of interest may have relatively large spatial areas, which can lead to efficient coding in the presence of content motion.

25 Claims, 10 Drawing Sheets

FIG. 1
100
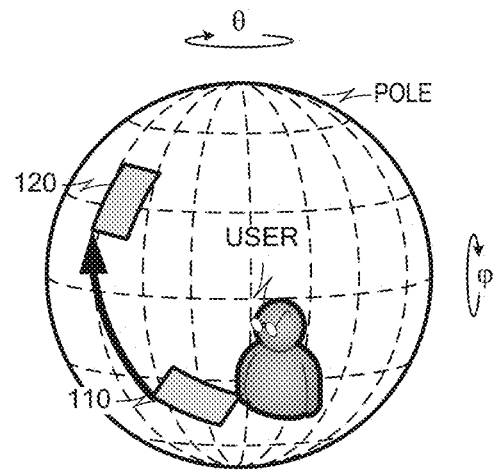
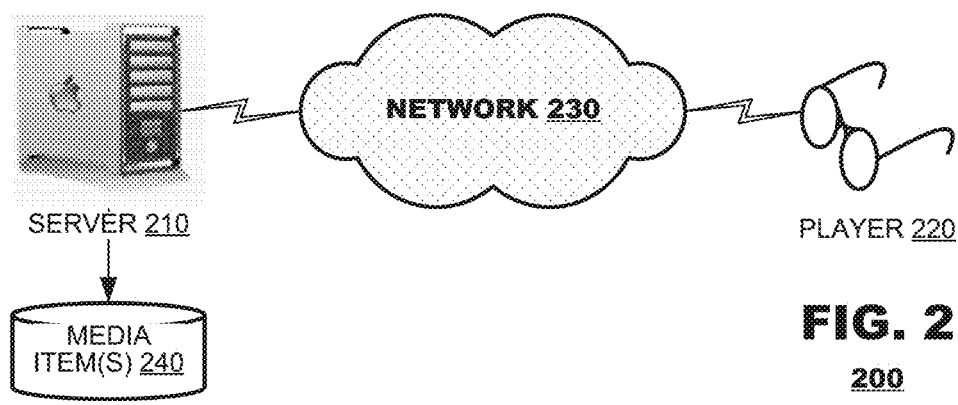
FIG. 2
200
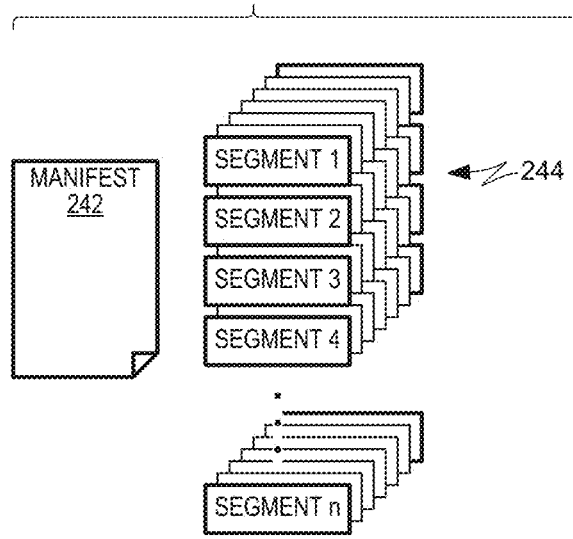

400

500

600

700

800

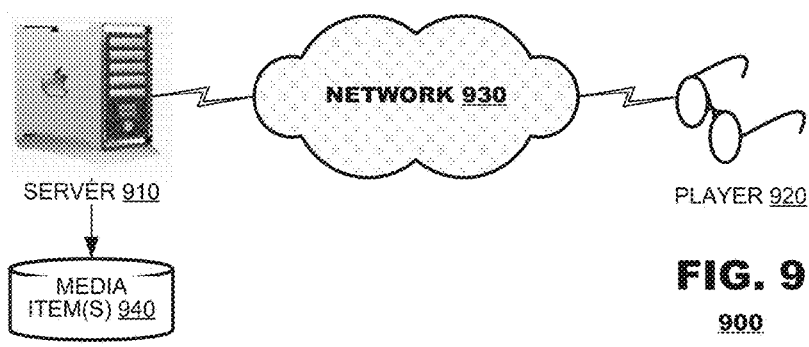
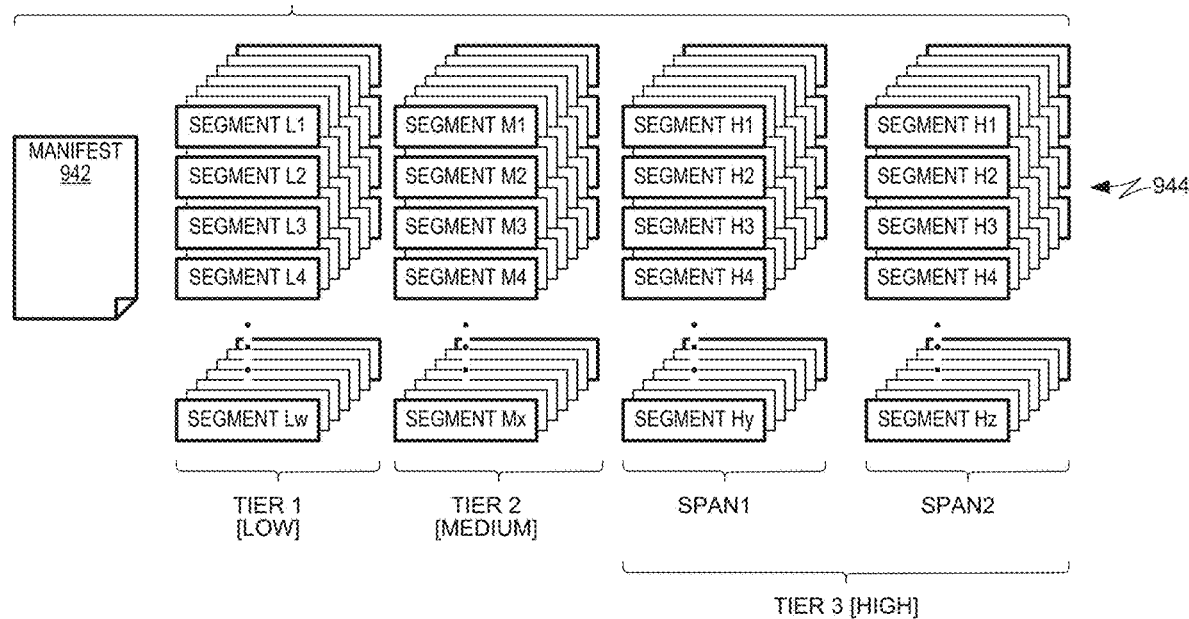
FIG. 9
900

1000

1100

1200

1400

1500

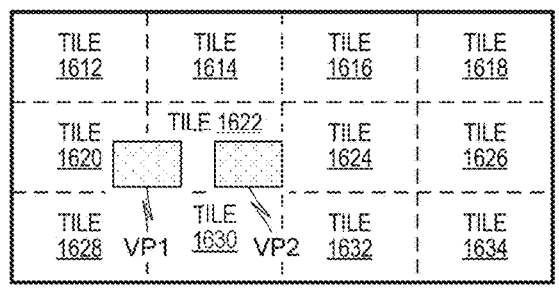
FIG. 16
1600
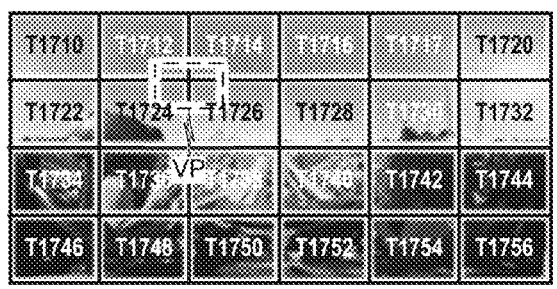
FIG. 17
1700
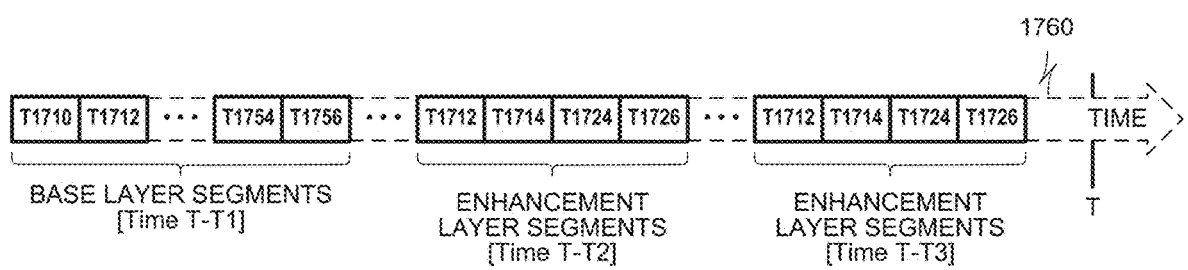

1800

1900

US 10,972,753 B1

VERSATILE TILE CODING FOR MULTI-VIEW VIDEO STREAMING

BACKGROUND

Multi-view video applications are expected to become an emerging application for consumer electronic systems. Multi-view video may deliver an immersive viewing experience by displaying video in a manner that emulates a view space in multiple directions (ideally, every direction) about a viewer. Viewers, however, typically view content from a small portion of the view space, which causes content at other locations to go unused during streaming and display.

Multi-view video applications present challenges for designers of such systems that are not encountered for ordinary "flat" viewing applications. Ordinarily, it is desired to apply all available bandwidth to coding of video being viewed to maximize its quality. On the other hand, failure to stream non-viewed portions of a multi-video would incur significant latencies if/when viewer focus changes. A rendering system would have to detect the viewer's changed focus and reallocate coding bandwidth to represent content at the viewer's new focus. In practice, such operations would delay rendering of desired content, which would frustrate viewer's enjoyment of the multi-view video and lower the user experience of the system.

BRIEF DESCRIPTION OF THE DRAWINGS

FIG. 1 illustrates application of multi-view rendering techniques according to an aspect of the present disclosure.

FIG. 2 illustrates a video exchange system according to an aspect of the present disclosure.

FIG. 9 illustrates a video exchange system according to another aspect of the present disclosure.

FIG. 16 illustrates a further tiling technique for a multi-view frame according to an aspect of the present disclosure.

FIG. 17 illustrates a prefetching operation according to an aspect of the present disclosure.

DETAILED DESCRIPTION

Figure 3:
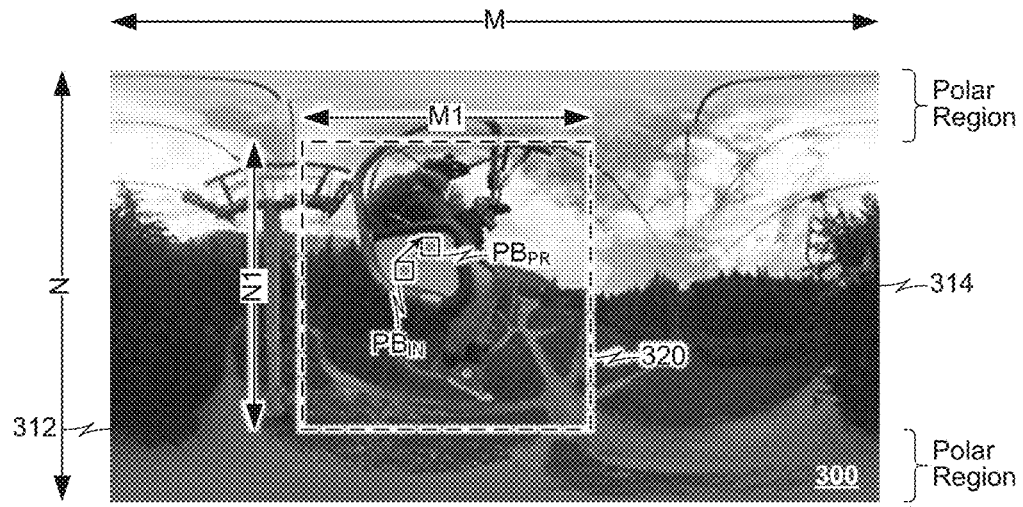
FIG. 3 illustrates an exemplary frame with a saliency region suitable for use with aspects of the present disclosure.

Aspects of the present disclosure provide video coding and delivery techniques for multi-view video in which the multi-view video is partitioned spatially into a plurality of tiles that, in aggregate, encompass the entire spatial area of the video. A temporal sequence of each tile's content is coded as an individually-downloadable segment that contains coded video representing content contained within its respective tile. Tiles may be given different sizes based on saliency of the content within their respective regions. In this manner, tiles with high levels of interest may have relatively large spatial areas, which can lead to efficient coding in the presence of content motion.

FIG. 1 illustrates application of multi-view rendering techniques according to an aspect of the present disclosure. Multi-view rendering typically involves presentation of media in a manner that simulates omnidirectional image content, as if content of the media item occupies an image space 100 that surrounds a user entirely. Typically, the user views the image space 100 through a player device that presents only a sub-part of the image space (called a "viewport" for convenience) at a time. At a first point in time, the user may cause a viewport to be displayed from a first location 110 within the image space 100, which may cause media content from a corresponding location to be presented. At another point in time, the user may shift the viewport to another location 120, which may cause media content from the new location 120 to be presented. The user may shift location of the viewport as many times as may be desired. When content from a first viewport location is presented to the user, content from other location(s) need not be rendered for the user.

FIG. 2 illustrates a video exchange system 200 according to an aspect of the present disclosure. The system 200 may include a server 210 and a player device 220 provided in communication via a network 230. The server 210 may store one or more media items 240 for delivery to the player 220. Thus, the player 220 may request a media item from the server 210 and display it when the server 210 delivers the requested media item.

In an aspect, individual media items 240 may be stored as a manifest file 242 and a plurality of segments 244. A manifest file 242 may store an index of the segments with information identifying the segments' temporal order in a playback timeline and identifiers of network locations from which the segments may be downloaded. The segments 244 themselves contain video data of the media item. The segments 244 may be organized to correspond to portions of a multi-view image space 100 (FIG. 1) at different spatial locations and different times. In other words, a first segment (say segment 1) stores video information of a first spatial location of the multi-view image space 100 for a given temporal duration and other segments (segments 2-n) store video information of other spatial locations of the multi-view image space 100 during the same temporal duration.

The media item 240 also may contain other segments (shown in stacked representation) for each of the spatial locations corresponding to segments 1-n at other temporal durations of the media item 240. Segments oftentimes have a common temporal duration (say, 5 seconds). Thus, a prolonged video of a multi-view image space 100 may be developed from temporal concatenation of multiple downloaded segments.

Typically, segments store compressed representations of their video content. During video rendering, a player 220 reviews the manifest file 242 of a media item 240, identifies segments that correspond to desired video content of the multi-view image space, and issues individual requests for each of the desired segments to cause them to be downloaded. The player 220 may decode and render video data from the downloaded segments.

The principles of the present disclosure find application with a variety of player devices, servers and networks. As illustrated in FIG. 2, a player 220 may be embodied as a head-mounted display. Alternatively, players may be embodied in smart phones, tablet computers, laptop computers, personal computers, flat-panel displays, entertainment systems, and/or gaming systems. For non-mobile player devices such as large flat-panel devices and the like, users may identify desired viewports through user input devices (not shown). Such variants among types of player device are immaterial to the present discussion unless noted otherwise.

Additionally, the principles of the present disclosure may find application with a variety of video source devices 210 including not only servers, as illustrated, but also personal computers, video production systems, and/or gaming servers. Moreover, media items may be provided either as pre-produced or live content. In a live content implementation, media items may be generated as they are stored. New segments 244 may be input to the server 210 as they are generated, and manifest files 242 may be revised as the new segments 244 are added. In some implementations, a server 210 may store video of a predetermined duration of the live media item, for example 3 minutes' worth of video. Older segments may be evicted from the server 210 as newer segments are added. Segment eviction need not occur in all cases, however; it is permissible to retain older segments, which allows media content both to be furnished live and to be recorded simultaneously.

Similarly, the network 230 may constitute one or more communication and/or computer networks (not shown individually) that convey data between the server 210 and the player 220. The network 230 may be provided as packet-switched and/or circuit switched communication networks, which may employ wireline and/or wireless communication media. The architecture and topology of the network 230 is immaterial to the present discussion unless noted otherwise.

Aspects of the present disclosure perform frame segmentation according to saliency of content within video sequences. FIG. 3 illustrates an exemplary frame 300 representing a multi-view image space. In this example, the frame 300 illustrates omni-directional content contained within a two-dimensional representation of M×N pixels. Content at one edge 312 of the frame 300 is contiguous with content at another edge 314 of the frame 300, which provides continuity in content in all directions of the frame's image space.

FIG. 3 illustrates an exemplary saliency region 320 within the frame 300 having M1×N1 pixels. The saliency region 320 may be used as a basis of frame segmentation according to aspects of the present disclosure.

Figure 4:
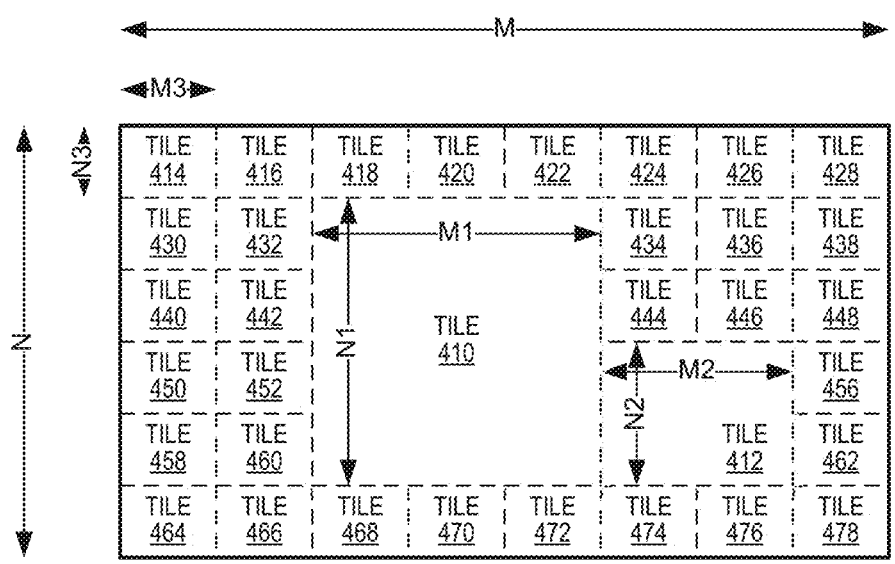
FIG. 4 illustrates a tiling technique of a multi-view frame according to an aspect of the present disclosure.

FIG. 4 illustrates exemplary segmentation of a multi-view frame 400 according to an aspect of the present disclosure. In this example, the frame 400 is segmented into a plurality of tiles 410-478 each occupying a spatial region of the frame 400 that, in aggregate, cover all M×N pixels of the frame 400.

In this example, a first tile 410 is defined as having M1×N1 pixels. The first tile 410 be defined to correspond to the saliency region 320 illustrated in FIG. 3. For illustrative purposes, FIG. 4 illustrates a second exemplary tile 412, shown as having M2×N2 pixels even though there is no second saliency region illustrated in FIG. 3. Thus, a source frame 400 may be segmented into any number of saliency region tiles 410-412 according to saliency regions detected in a video sequence.

Typically, saliency region tiles 410-412 will not occupy the entire spatial area of a frame 400. Once saliency region tiles have been defined for an image, the remainder of a frame 400 may be partitioned into other tiles 414-478 until the entire spatial area of the frame 400 has been assigned to at least one tile. Having thus partitioned frames of a video sequence in this manner (only one such frame is illustrated in FIG. 4), the tiles 410-478 of a video sequence may be coded as segments 244 (FIG. 2), stored at a server 210, and made available to players 220.

It is expected that, when video frames are partitioned in such a manner, it will lead to increased efficiency of video compression operations when applied to the saliency regions. Video compression operations typically exploit spatial and temporal redundancies in video content by identifying similarities in video content and then differentially-coding content when such similarities are identified. Identification of similarity among video content involves a prediction search which compares a content element PBIN that is being coded (called a "pixel block," for convenience) to previously-coded pixel blocks that are available to a video coder. To exploit temporal redundancy, standard video encoders compare the content element PBIN to be encoded (called a "pixel block," for convenience) to numerous previously-coded pixel block candidates (such as PBPR in FIG. 3) residing inside the search window from the reference frames to identify the best matching block. To exploit spatial redundancy, standard video encoders populate numerous prediction block candidates based on neighboring pixels (called "reference samples") and favor the prediction block that minimizes the prediction error compared with PBIN.

Coding efficiencies are expected to be achieved through use of saliency tiles 410, 412 because, when used with predictive video coding, the saliency tiles 410, 412 may accommodate prediction search windows of sufficient size to increase the likelihood that highly-efficient prediction pixel blocks PBPR will be found during prediction searches. When tiles are partitioned without consideration of saliency within video content, then because the tiles are coded independently of each other, prediction searches will be constrained to fall within the spatial area occupied by each individual tile. A pixel block from tile 436, for example, could not be coded using a prediction pixel block from tile 438 because tiles 436 and 438 are coded independently from each other. By defining saliency tiles 410, 412 to have a size sufficient to accommodate salient content, it is expected that opportunities to code video data efficiently will be retained.

Figure 5:
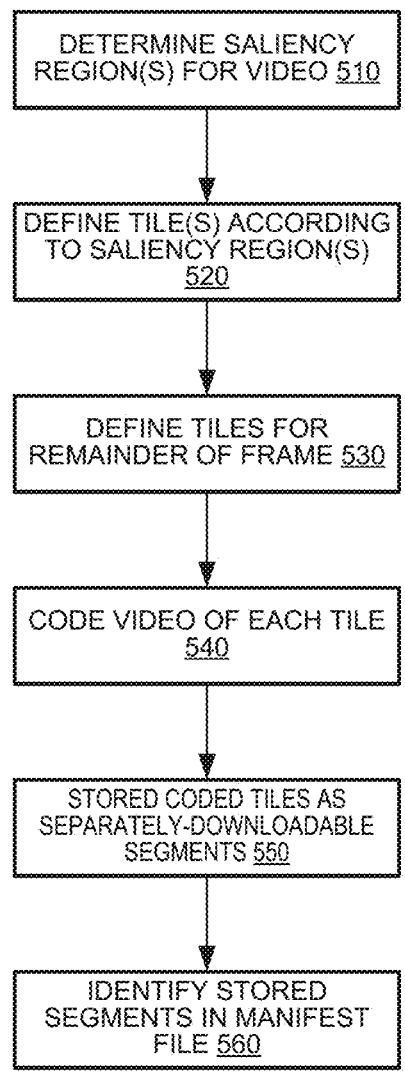
FIG. 5 illustrates a method according to an aspect of the present disclosure.

FIG. 5 illustrates a method 500 according to an aspect of the present disclosure. The method 500 may begin by determining saliency region(s) within a video sequence representing multi-view video (box 510). The method 500 may define tiles within the sequence's frames according to the saliency region(s) (box 520), and thereafter define tiles for the remainder of the frames (box 530). The method 500 may code video of each tile (box 540) and store the coded tiles as separately-downloadable segments (box 550). The method 500 may identify the stored segments in a manifest file (box 560) representing the multi-view video.

Identification of saliency regions may occur in a variety of ways. In a first aspect, saliency regions may be identified from video content. Foreground/background estimation, for example, may identify foreground objects in video content, which may be identified as regions of interest for saliency identification. Object detection (for example face detection, human body detection, or other predetermined objects) may be detected from video content, which also may be identified as regions of interest. Content motion, particularly identification of regions having motion characteristics that are different from overall motion detected within video content, may be identified as regions of interest. Content complexity also may drive saliency estimation; for example, regions of smooth content tend to exhibit spatial redundancy, which can lead to efficient coding if allocated to larger tiles. In these aspects, locations of regions of interests may be identified from among individual frames within a video sequence and the locations may be aggregated across the video sequence to determine an area of a saliency region.

Figure 6:
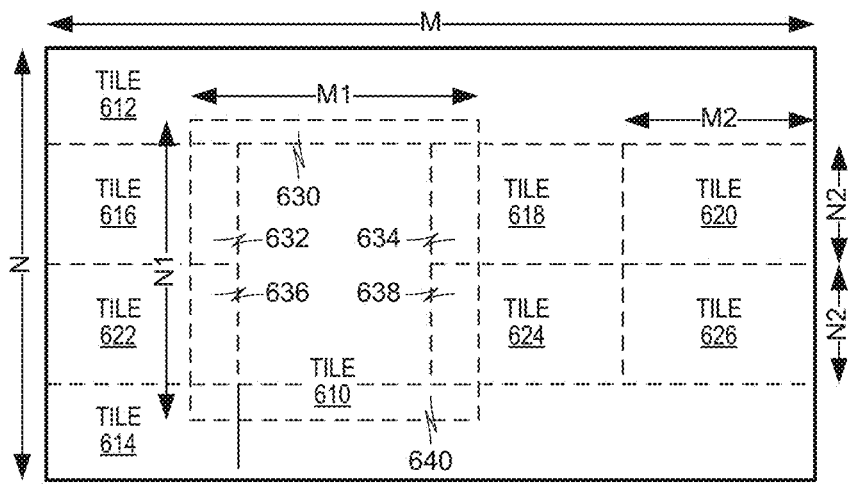
FIGS. 6-8 illustrate other tiling techniques for a multi-view frame according to aspects of the present disclosure.

In another aspect, some projection formats, such as the equi-rectangular projection ("ERP") and the equatorial cylindrical projection ("ECP") introduce oversampled data in the polar areas. Namely, a relatively small polar region of a source image space (FIG. 1) is flattened when transformed to those projection geometries. For such projection format, larger tiles can be designed and used in polar regions to improve coding efficiency for polar region viewport rendering FIG. 6 illustrates another exemplary tiling scheme 600 for multi-view video to accommodate an object-based saliency and projection redundancies. In this example, a first tile 610 is defined with M1×N1 pixels to accommodate an object-based saliency region such as region 320 (FIG. 3). Other tiles 612, 614 may be defined according to projection redundancy, corresponding to polar regions of the frame 300. Frame content closer to equatorial locations within a multi-view image space may not be identified as saliency regions and they may be assigned to tiles 616-626 according to a default process.

Moreover, in the example of FIG. 6, some elements of frame content may be assigned to more than one tile. In this example, boundaries of the first tile 610 overlap boundaries of the neighboring tiles 612-618 and 622-626. Pixels from the frame 600 that fall within overlapping regions 630-640 among these tiles 612-618 and 622-626 may be assigned to each tile that includes them, and they may be represented redundantly in such tiles when they are encoded. Such implementations may be convenient when it is desired to define non-saliency tiles 616-626 using a uniform size (shown as M2×N2).

Figure 7:
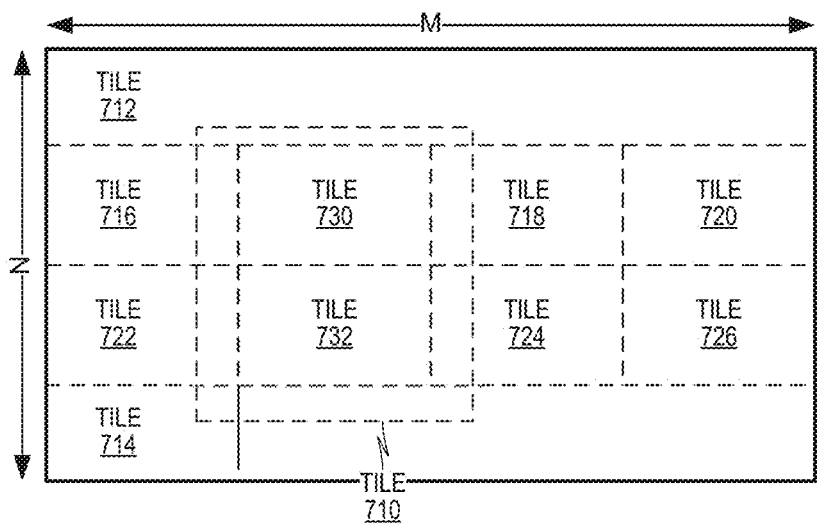
Figure 8:
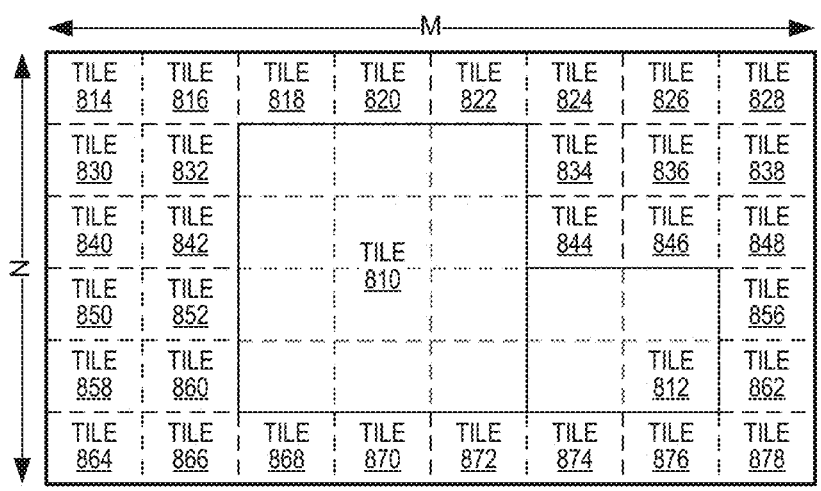

Moreover, as illustrated in FIGS. 7 and 8, aspects of the disclosure accommodate implementations in which, in box 530 (FIG. 5), tiles for non-saliency regions would be defined to cover frames in their entirety. FIG. 7 illustrates the tiling scheme of FIG. 6 in which tiles 710, 712 and 714 accommodate respective saliency regions. Remaining tiles 716-732 are shown defined for the frame 700, which cover the entire spatial area of the frame. Whereas the aspect shown in FIG. 6 lacks non-saliency tiles in a center region of saliency tile 610, tiles 730 and 732 are provided in this region in the FIG. 7 example. In this manner, the non-saliency tiles 716-732 occupy the entire space of the frame 700.

FIG. 8 illustrates similar principles applied to the segmentation scheme of FIG. 4; non-saliency tiles that underlie saliency tiles 810 and 812 are not labeled simply for ease of illustration. Although coded representations of tiles 730, 732 may lack some of the coding efficiencies afforded by coding the same content in a tile 710, provision of redundant tiles may afford streaming and decoding flexibility to player devices in some use cases.

As discussed, during media play events, a player 220 (FIG. 2) downloads segments 244 corresponding to the tile(s) that are to be rendered, decodes content of the segments 244, and renders it. The player 220 may determine a location of its viewport in a three-dimensional image space represented by the video data and may compare that location to tile locations identified by the manifest file 242 as represented by the coded segments 244. Player viewports need not align with spatial locations of tiles; if the player 220 determines that its viewport spatially overlaps multiple tiles, the player 220 may download all such tiles whose content corresponds to the spatial location of its viewport.

FIG. 9 illustrates a video exchange system 900 according to another aspect of the present disclosure. Here, as in the aspect of FIG. 2, the system 900 may include a server 910 and a player device 920 provided in communication via a network 930. The server 910 may store one or more media items 940, represented by a manifest file 942 and segments 944, for delivery to the player 920. The manifest file 942 may include an index of the segments 944 representing respectively, spatial locations of segment content within a multi-view image space and network locations of the segments where they are available for download.

In the aspect of FIG. 9, segments 944 may be available at different levels of service (called, "tiers," for convenience). Each tier may represent segment video content at a respective level of service, which often is dictated by target coding bitrates assigned to the tier. For example, FIG. 9 illustrates low, medium, and high tiers, representing coded video at respective low, medium and high levels of quality. Video coding processes tend to be lossy processes, which cause recovered video data to represent its source video but with some coding errors. When video is coded at a first, relatively low bitrate level, it tends to exhibit greater error on recovery (and, hence, lower quality) than the same video when it is coded at a second, higher bitrate level. Thus, the coding bitrates of the respective tiers can determine their coding quality.

In the aspect of FIG. 9, a media server 910 may store segments 944 of multi-view video in multiple tiers and, optionally, multiple spans. Segments of each tier, in aggregate, may cover the area of the multi-view image space (FIG. 1) being represented. The tile sizes used within each tier may, but need not be, different than the tile sizes used in other tiers. When multiple spans are used, an individual tier (in this example, a high service tier) may represent content of the multi-view image space in multiple redundant representations with different partitioning schemes applied to them.

Figures 10, 11, 12:
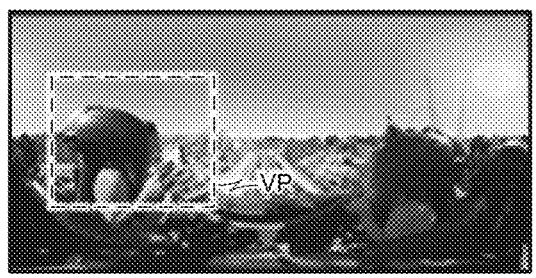
FIG. 10 illustrates an exemplary frame suitable for use with aspects of the present disclosure.
FIGS. 11-12 illustrate other tiling techniques for a multi-view frame according to aspects of the present disclosure.

FIGS. 10-12 illustrate exemplary use of tiling and spans according to an aspect of the present disclosure. FIG. 10 illustrates an exemplary multi-view frame 1000 that may be coded as tiles and spans. FIG. 11 illustrates an exemplary partitioning 1100 of the frame 1000 of FIG. 10, in which tiles 1102-1198 are defined of equal size. FIG. 12 illustrates an exemplary partitioning 1200 of the frame 1000 of FIG. 10 in which tiles 1212-1234 are defined. The tiles 1212-1234 of FIG. 12 occupy larger areas than counterpart tiles 1102-1198 in the partitioning scheme of FIG. 11. Although the tiles 1102-1198 and 1212-1234 are shown to be of equal size within each partitioning scheme, this is not required. One tile (say, tile 1136) of partitioning scheme 1100 may be larger than the other tiles of that scheme 1100 as shown, for example, in FIG. 4. Similarly, one tile 1222 of scheme 1200 may be larger than other tiles of that scheme 1200.

The partitioning schemes of FIGS. 11 and 12 may find useful application in multi-view video coding applications. First, it may be useful to apply the partitioning scheme 1100 of FIG. 11 to generate a representation of various lower quality tiers of service (FIG. 9), which permits a player device to retrieve and download appropriate segments of content from a server at modest bandwidth. It also may be useful to apply the partitioning scheme 1200 of FIG. 12 to generate a representation of a high-quality tier of service (FIG. 9), which permits a player device to download appropriate segments of video based on a current or predicted location of a viewport VP (FIG. 10). In this manner, the player will decode and render segments of high-quality video in viewport locations.

It also may be convenient to apply the partitioning scheme 1100 of FIG. 11 to generate a second span at the high-quality level of service. In this aspect, a server (FIG. 9) would store two sets of segments for a single level of service: a first set of segments that represent a frame 1000 (FIG. 10) partitioned according to the partitioning scheme 1100 of FIG. 11 (a first span) and a second set of segments that represent the frame 1000 partitioned according to the scheme 1200 of FIG. 12 (a second span). In this manner, a player device has flexibility to download segments of high-quality video at different tile sizes, which provides a finer degree of control over the aggregate data rate consumed by such downloads than if there were only one span of high-quality data available.

Figure 13:
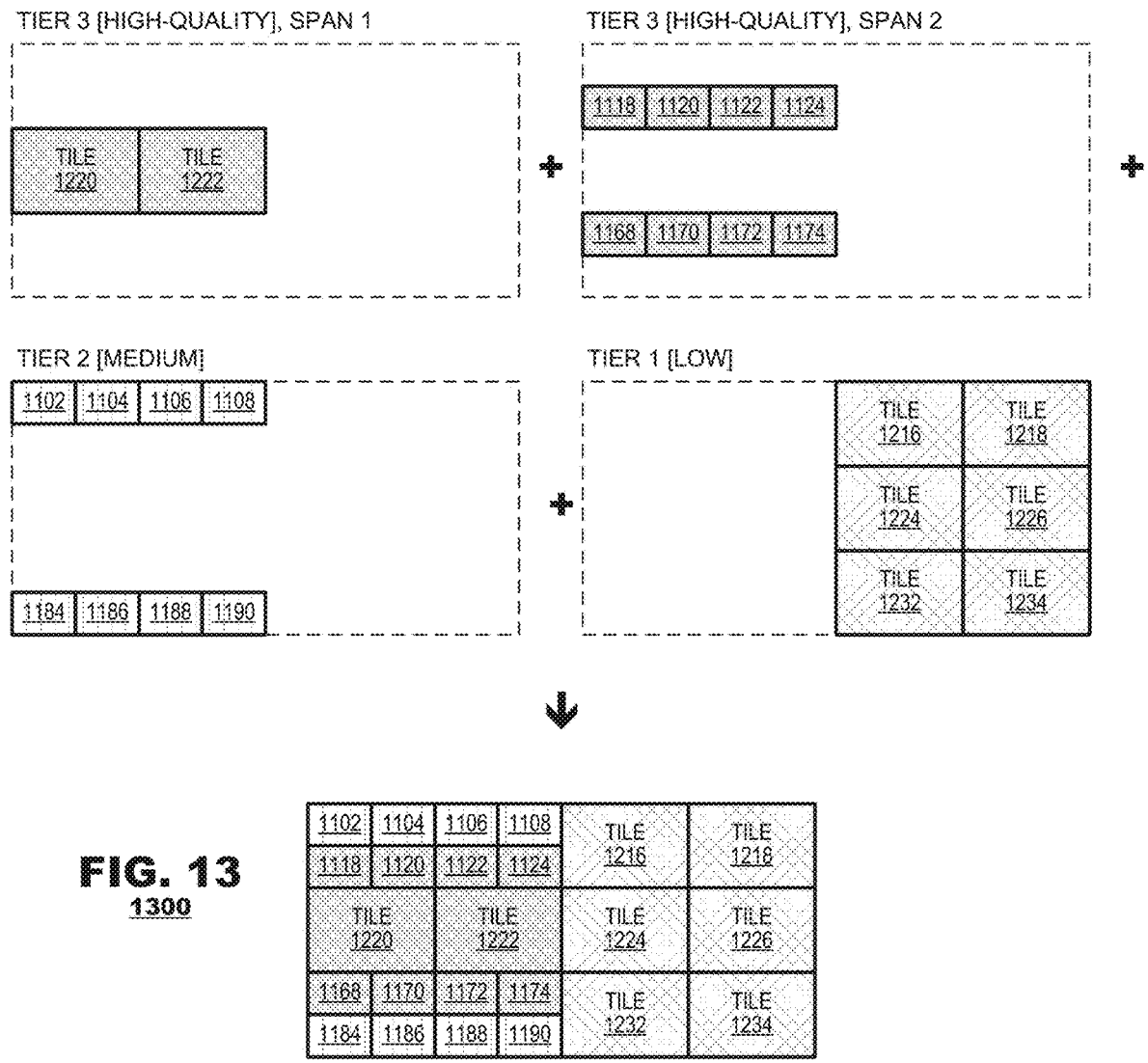
FIG. 13 illustrates an exemplary multi-view frame 1300 that may be developed from tiles according to an aspect of the present disclosure.

FIG. 13 illustrates an exemplary multi-view frame 1300 that may be developed from tiles 1220, 1222 of a first span of high-quality video, tiles of a second span of high-quality video 1118-1124 and 1168-1174, tiles 1102-1108 and 1184-1190 of medium-quality video and tiles of 1216-1218, 1224-1226, and 1232-1234 of low-quality video. The spatial arrangements of tiles and the number of spans may be tailored to suit individual application needs.

In practice, tiles of different spans for different timestamps can be streamed in different priorities and prefetched asynchronously. In one aspect, a server may store a "super" tile representing an entire multi-view image, which can be retrieved by a player in a prefetching manner, ahead of playback. The super tile may be coded at low-quality and prefetched ahead of playback to provide robustness against bandwidth variation, transmission errors, and user field of view dynamics. Smaller tiles, which correspond to predicted viewport locations can be retrieved closer to their display deadline within a media time (e.g., 1 or 2 seconds ahead), which may provide higher-quality and faster viewport responsiveness when field of view predictions can be accurately made.

Figure 14:
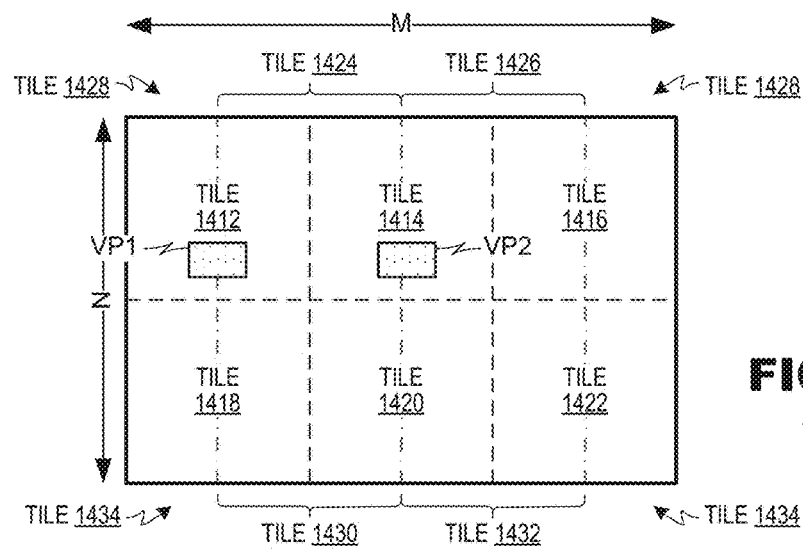
FIG. 14 illustrates another tiling technique for a multi-view frame according to an aspect of the present disclosure.

In a further aspect, shown in FIG. 14, frames may be partitioned into overlapping tiles. In FIG. 14, a frame 1400 of M×N pixels is shown partitioned into a first set of tiles 1412-1422 which occupy the entire spatial area of the frame 1400. The frame 1400 is redundantly partitioned into a second set of tiles 1424-1434, which spatially overlap the other tiles 1412-1422. For example, tile 1424 overlaps with a portion of tile 1412 and a portion of tile 1414, and tile 1426 overlaps with a second portion of tile 1414 and a portion of tile 1416. Tiles 1428 and 1434 may occupy spatial areas that wrap around lateral edges of the frame 1400. Tile 1428, for example, may overlap portions of tile 1412 and tile 1416, and tile 1434 may overlap portions of tile 1418 and tile 1442.

The partitioning scheme illustrated in FIG. 14 permits player devices to select tiles in response to changes in viewports. Consider an example where a viewport initially is located within a central area of the tile 1412 (VP1) but moves laterally within the frame 1400 until it is located within a central area of the tile 1414 (VP2). Without a tile such as tile 1424, at some point, the area of the viewport would straddle a boundary between tiles 1412 and 1414, which would compel a player device to retrieve content of both tiles to render content for the entire viewport. Using the partitioning techniques in FIG. 14, however, a player may retrieve content for a single tile—tile 1424, in this example—when the viewport straddles the boundary between tiles 1412 and 1414. The player may retrieve tile 1414 when the viewport is contained entirely within tile 1414. This aspect, therefore, reduces bandwidth consumption that would be incurred if two tiles 1412, 1414 were retrieved due to viewport location.

Figure 15:
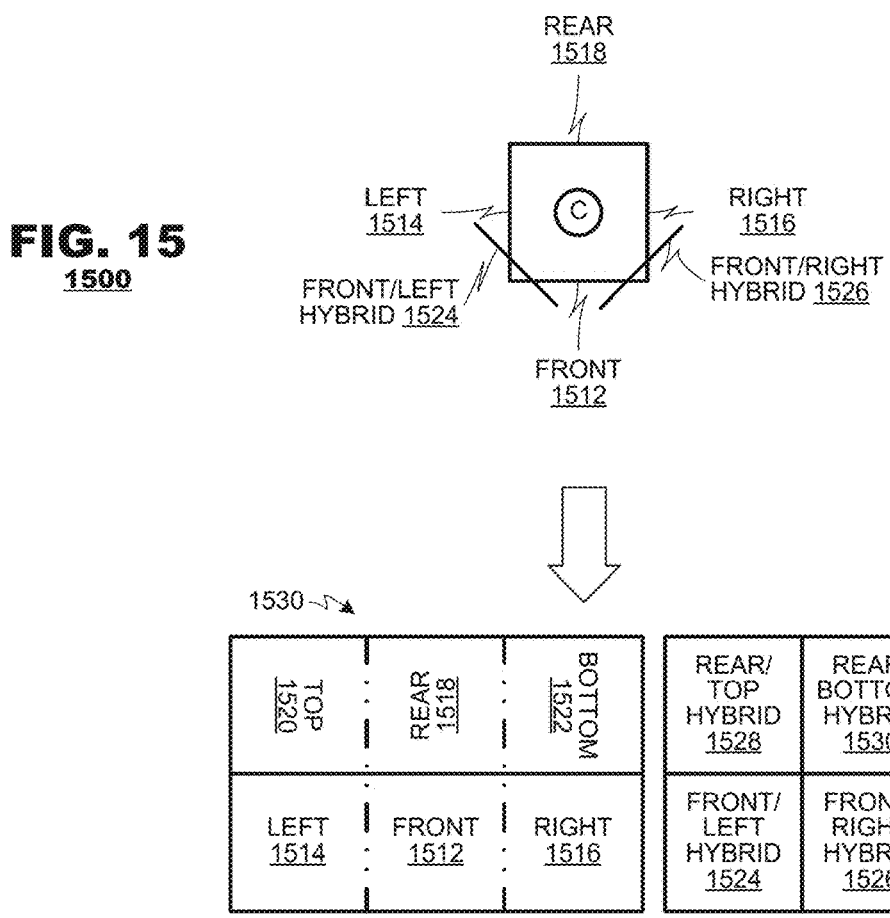
FIG. 15 illustrates an exemplary frame packing format suitable for use with aspects of the present disclosure.

In a further aspect, illustrated in FIG. 15, content of overlapping tiles may have perspective correction applied to them to reduce visual artifacts that may be introduced by multi-view frame formats. FIG. 15 illustrates an example in which a cube map image is formed from multi-view image data formed from sub-images generated about a centroid C representing a front sub-image 1512, a left sub-image 1514, a right sub-image 1516, a rear sub-image 1518, a top sub-image 1520, and a bottom sub-image 1522. These sub-images 1512-1522 may be packed into an M×N pixel frame format 1530. Image content from some of the sub-images may be arranged to be continuous with image content from other sub-image, shown by dashed lines. Thus, in the example shown in FIG. 15, image content from the front sub-image 1512 may be arranged to be continuous with content from the left sub-image 1514 on one side and to be continuous with content from the right sub-image 1516 on the other side. Similarly, image content of the rear sub-image 1518 can be placed in the packing format 1530 so that image content from one edge of the rear sub-image 1518 is continuous with content from the top sub-image 1520 and image content on another edge of the rear sub-image 1518 is continuous with content from the bottom sub-image 1522. Image content from the front sub-image 1512, however, is not continuous with content from the rear sub-image 1518 even though the sub-images are placed adjacent to each other in the packing format 1530 illustrated in FIG. 15.

In an aspect, tiles 1524-1530 may be developed for regions of the packing format 1530 where continuity exists along boundaries of sub-images contained within the packing format 1530. In the example of FIG. 15, a tile 1524 may be developed that contains hybrid content developed from content along the edges of sub-images 1512 and 1514. For example, the hybrid content may have perspective correction applied to the corresponding content of sub-images 1512 and 1514 to remove artifacts that may appear due to a cube map projection. The image content may be projected, first, from its native cube-map projection where sub-images correspond to different faces of a multi-view image space to a spherical projection. The image content thereafter may be projected from the spherical projection to a new cube map projection using new faces whose centers are disposed along edges of the prior sub-images. For example, for tile 1524, a new sub-image "face" would be created having an orientation about the centroid that is angled with respect to each of the front and left faces of the prior tiles 1512, 1514. Another sub-image 1526 may be generated using a face that is angled with respect to front and right faces of the tiles 1512, 1516. Although not shown in FIG. 15, hybrid sub-images 1528, 1530 may be generated from rear, top and bottom sub-images 1518, 1520, 1522 as well.

In an aspect, service tiers may be defined using scalable coding techniques in which a first base layer provides a representation of a corresponding tile at a first level of quality and other enhancement layers provide supplementary information regarding the tile to improve its coding quality. The enhancement-layer tiles are coded relative to the base-layer or lower enhancement-layer tiles, with spatial and temporal prediction enabled across layers but not across tile boundaries. In this manner, for example, the viewport tiles can be retrieved using enhancement layers to improve video quality. In this scheme, base-layer coded tiles can be pre-fetched much earlier than the display deadline (e.g., 20 seconds ahead), to provide a basic representation of a multi-view frame, robustness against network variations and viewport dynamics. The enhancement-layer coded tiles may be pre-fetched closer to the display deadline (e.g., 1-2 seconds ahead), to ensure that the predicted viewing direction is accurate, and the minimum number of tiles are retrieved for the viewport.

During the streaming, a player may select and request base-layer and enhancement-layer tiles according to scheduling logic within the player, based on available bandwidth, based on the player's buffer status, and based on a predicted viewport location. For example, a player may prioritize base-layer tile download to maintain a target base-layer buffer length (e.g., 10 seconds). If the base-layer buffer length is less than this target, the client player may sequentially download the base-layer tiles. Once the base-layer buffer length is sufficient, the client can exploit the bandwidth to download enhancement-layer tiles at higher rates.

A player may track viewport prediction accuracy and dynamically correct tile selections to compensate for mismatches between a previously-predicted viewport location and a later-refined viewport location. Consider an example shown in FIG. 16. Consider an example shown in FIG. 16. At a time T-Δ1, a player may predict a viewport location VP1 at a later time T. In this case, the player may impose a pre-fetching priority that favors tiles 1620, 1622 over other tiles in the frame. For example, it may request high-quality representations for tiles 1620 and 1622, perhaps intermediate-quality representations for nearby tiles 1628 and 1630 (as a protection against viewport prediction error) and low-quality representations for the remaining tiles.

If, at a later time T-Δ2, the player predicts a new viewport location VP2 at time T, the player may determine that the previous viewport prediction VP1 is not accurate. The player can adjust the scheduling decisions accordingly (e.g., tile rate, tile prioritization, etc.). In this example, Tile 1622 may be prioritized with a higher quality. Under this context, if a mid-quality version of tile 1622 is already downloaded, the player can further request an enhancement-layer tile for tile 1622 to improve quality. Similarly, if tile 1620 has not been downloaded, its priority can be lowered. In practice, tile prioritization can be determined based on the size of overlapping area or center distance between the candidate tile(s) and the predicted field of view, in addition to the estimated network throughput, buffer occupancy and channel utilization cost, etc. A player may dynamically synchronize and assembles the downloaded base-layer tiles and corresponding enhancement-layer tile (sometimes in multiple layers) according to the display offset and enhancement-layer tile locations.

In a further aspect, a player may schedule segment downloads at various times according to various prediction operations. FIG. 17 illustrates an exemplary frame 1700 of video at a rendering time T populated by tiles T1710-T1756. A player may perform a succession of viewport predictions at various times before the rendering time, and it may prefetch segments of predicted tiles selected according to those predictions.

FIG. 17 illustrates a timeline 1760 representing exemplary prefetch operations according to an aspect of the disclosure. At a first time, shown as time T-T1, a player may perform a first prefetch operation, downloading a plurality of tiles. The first prefetch operation may be performed sufficiently far in advance of the rendering time T (say, 10 seconds beforehand), that no meaningful prediction of viewport may be performed. In a simple implementation, the player may download segments of all tiles T1710-T1756 of the frame 1700 at a base level of quality (shown as base layer segments).

A second prefetch operation may be performed at a later time, shown as T-T2, which is closer to the rendering time. The second prefetch operation may be performed after predicting a viewport location VP within the frame 1700. In the example of FIG. 17, the prediction indicates that the viewport is located in a region occupied by tiles T1712, T1714, T1724, and T1726. The player may download segments corresponding to those tiles at a second level of quality, shown as enhancement layer segments.

Aspects of the present invention accommodate other prefetch operations as may be desired. For example, FIG. 17 illustrates a third download operation performed at another time, shown as T-T3, closer to the rendering time T. Again, the player may predict a location of a viewport VP at time T, and it may download segments associated with that location. The second downloaded set of enhancement layer segments may improve coding quality of the tiles that would be achieved by the base layer segments and the first enhancement layer segments.

Figure 18:
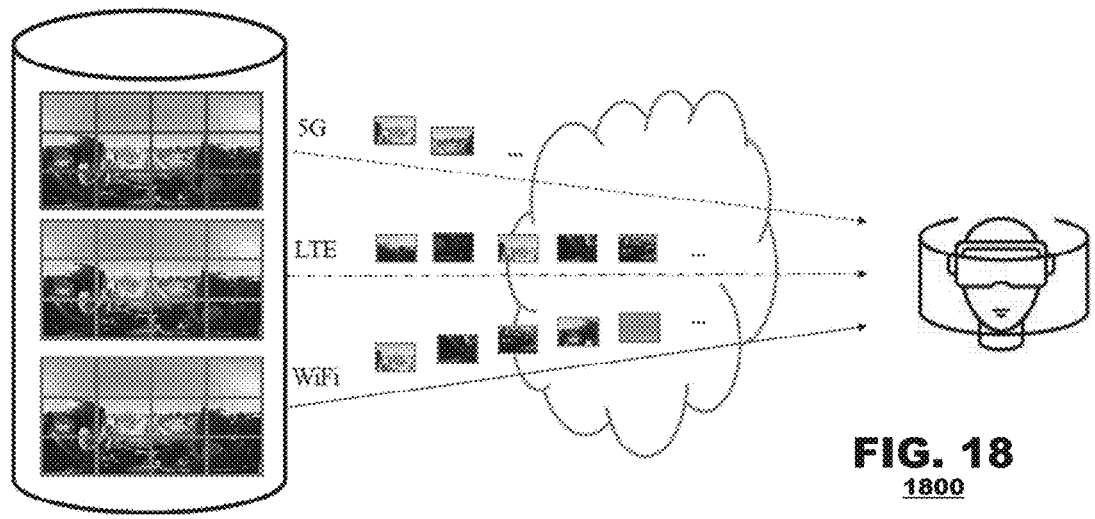
FIG. 18 illustrates segment delivery techniques according to an aspect of the present disclosure.

In another aspect, illustrated in FIG. 18, tiles with different rates and priorities, either scalably-coded or simulcasted, may be routed through heterogeneous network paths within communication networks (e.g., WiFi, LTE, 5G, etc.) with different channel characteristics such as bandwidth, latency, stability, cost, etc. Routing can be formulated based on channel capacity. For instance, the low-rate tiles can be delivered through "slow" channels such as WiFi or LTE, whereas the high-rate or highly-prioritized tiles can be delivered through "faster" channels, such as 5G. Alternatively, routing can be formulated based on the channel costs. For example, low-rate tiles providing the basic quality can be streamed over a free WiFi network, if available. mid-rate tiles can be streamed over more expensive wireless network. The premium-quality tiles can be streamed over the presumably most expensive network (e.g., 5G), in which the data volume is triggered only when necessary.

Figure 19:
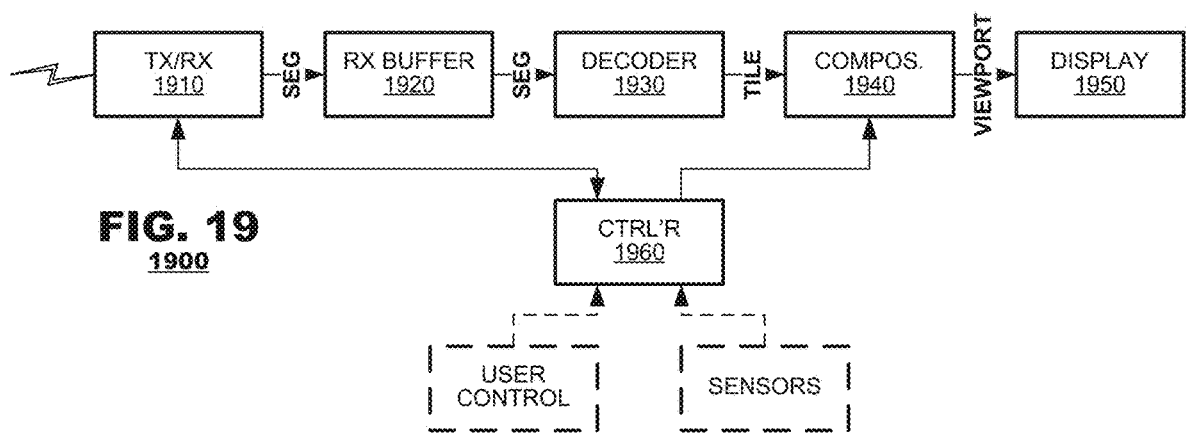
FIG. 19 is a simplified block diagram of a player according to an aspect of the present disclosure.

FIG. 19 is a simplified block diagram of a player 1900 according to an aspect of the present disclosure. The player 1900 may include a transceiver ("TX/RX") 1910, a receive buffer 1920, a decoder 1930, a compositor 1940, and a display 1950 operating under control of a controller 1960. The transceiver 1910 may provide communication with a network (FIG. 1) to issue requests for manifest files and segments of video and to receive them when they are made available by the network. The receive buffer 1920 may store coded segments when they are received. The decoder 1930 may decode segments stored by the buffer 1920 and may output decoded data of the tiles to the compositor 1940. The compositor 1940 may generate viewport data from the decoded tile data and output the viewport data to the display 1950.

The controller 1960 may manage the process of segment selection and download for the player. The controller 1960 may estimate locations of viewports and, working from information provided by the manifest file (FIG. 1) request segments corresponding to the tiles that are likely to be displayed. The controller 1960 may determine which segments to retrieve at which tier of service. And the controller 1960 may output data to the compositor 1940 identifying current viewport locations. Viewport location determinations may be performed with reference to data from sensors (such as accelerometers mounted on portable display devices) or user input provided through controls.

The foregoing description has presented aspects of the present disclosure in the context of player devices. Typically, players are provided as computer-controlled devices such as head mounted displays, smartphones, personal media players, and gaming platforms. The principles of the present discussion however, may be extended to personal computers, notebook computers, tablet computers, and/or dedicated videoconferencing equipment in certain aspects. Such player devices typically operate using computer processors that execute programming instructions stored in a computer memory system, which may include electrical-, magnetic- and/or optical storage media. Alternatively, the foregoing techniques may be performed by dedicated hardware devices such as application specific integrated circuits, digital signal processors and/or field-programmable gate array. And. of course, aspects of the present disclosure may be accommodated by hybrid designs that employ both general purpose and/or specific purpose integrated circuit. Such implementation differences are immaterial to the present discussion unless noted hereinabove.

Moreover, although unidirectional transmission of video is illustrated in the foregoing description, the principles of the present disclosure also find application with bidirectional video exchange. In such a case, the techniques described herein may be applied to coded video sequences transmitted in a first direction between two devices and to code video sequences transmitted in a second direction between the same devices. Each direction's coded video sequences may be processed independently of the other.

Although the disclosure has been described with reference to several exemplary aspects, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and aspects, the disclosure is not intended to be limited to the particulars disclosed; rather the disclosure extends to all functionally equivalent structures, methods, and uses such as are within the scope of the appended claims.

We claim:

1. A video source device, comprising:
   storage for coded video representing multi-view video, the coded video including a manifest file identifying a plurality of segments of the multi-view video available for download and network locations from which the segments may be downloaded, wherein
   the multi view video is partitioned spatially into a plurality of tiles having sizes that are determined based on saliency of the content within their respective regions, and
   each of the segments contains coded video representing content contained within a respective tile of the plurality of tiles.

2. The source device of claim 1, wherein a tile corresponding to a saliency region of the multi-view video has a larger size than another tile that does not correspond to a saliency region.

3. The source device of claim 2, wherein the saliency region corresponds to a region of interest identified from content of the multi-view video.

4. The source device of claim 2, wherein the saliency region corresponds to a region of low complexity of the multi-view video.

5. The source device of claim 1, wherein a first tile has a spatial area that overlaps with a spatial area of another tile.

6. The source device of claim 1, wherein the tiles have respective spatial areas that do not overlap each other.

7. The source device of claim 1, wherein the coded video includes segments coded at different tiers of service, each tier of service containing coded video of the multi-view video that is redundant but at a different quality to coded video contained within another tier of service.

8. The source device of claim 1, wherein the coded video includes segments coded at different tiers of service, wherein the tiles of each tier of service, in aggregate, occupy an entire spatial area of the multi-view video.

9. The source device of claim 1, wherein
   the coded video includes segments coded at different tiers of service,
   for at least one tier of service, plural sets of segments are provided, each set representing different partitioning of the multi-view video into tiles, and
   the tiles of each partitioning, in aggregate, occupy an entire spatial area of the multi-view video.

10. The source device of claim 1, wherein
    the coded video includes segments coded at different tiers of service according to scalable coding in which
    segments of a first tier of service are coded by base-layer coding, and
    segments of a second tier of service are coded by enhancement-layer coding.

11. A video decoding method, comprising:
    retrieving from a network a manifest file identifying a plurality of segments of a multi-view video available for download and tiles representing spatial areas of the multi-view video to which each segment corresponds, wherein the tiles are at sizes determined based on saliency of the content within their respective spatial areas,
    selecting, from the tiles identified in the manifest file, segment(s) to be rendered,
    retrieving from the network the selected segments according to network locations identified in the manifest file for the segments, and
    decoding the selected segments.

12. The method of claim 11, wherein the selecting comprises:
    estimating a viewport location at a future time, and
    selecting segments according to the estimated viewport location.

13. The method of claim 11, wherein the selecting comprises, when the manifest file identifies different tiers of service for the multi-view video,
    selecting a segment corresponding to an estimated viewport location at a first level of service, and
    selecting another segment that does not correspond to the estimated viewport at a second, tier of service lower than the first tier of service.

14. The method of claim 11, wherein the selecting comprises, when the manifest file identifies different tiers of service for the multi-view video,
    selecting segments of a first tile corresponding to an estimated viewport location including a first segment containing a base-layer coded representation of the tile and at least one other segment containing an enhancement-layer coded representation of the tile, and selecting a segment of a second tile that does not correspond to the estimated viewport containing a base-layer coded representation of the second tile.

15. The method of claim 11, wherein the selecting comprises:
at a first time, predicting a viewport location at a future time, and downloading tiles of segment(s) associated with the predicted viewport location at a first level of coding quality, and
at a second time, re-predicting the viewport location at the future time and downloading tiles of segment(s) associated with the re-predicted viewport location at a second level of coding quality higher than the first level of coding quality.

16. The method of claim 11, wherein the selecting comprises, when the manifest file identifies different tiers of service for the multi-view video,
estimating a first viewport location at a prefetch time, and selecting first quality representation of segments according to the first estimated viewport location, and
estimating a second viewport location at a later time, and selecting a second quality representation of segments according to the second estimated viewport location.

17. The method of claim 11, wherein, when the manifest file identifies different tiers of service for the multi-view video:
the coded video includes segments coded at different tiers of service,
for at least one tier of service, plural sets of segments are provided, each set representing different partitioning of the multi-view video into tiles, and
the tiles of each partitioning, in aggregate, occupy an entire spatial area of the multi-view video.

18. The method of claim 11, wherein a first tile has a spatial area that overlaps with a spatial area of another tile.

19. The method of claim 11, wherein the tiles have respective spatial areas that do not overlap each other.

20. Non-transitory computer readable medium containing program instructions that, when executed by a player device, cause the device to perform a method, comprising:
retrieving from a network a manifest file identifying a plurality of segments of a multi-view video available for download and tiles representing spatial areas of the multi-view video to which each segment corresponds, wherein the tiles are at sizes determined based on saliency of the content within their respective spatial areas,
selecting, from the tiles identified in the manifest file, segment(s) to be rendered, retrieving from the network the selected segments according to network locations identified in the manifest file for the segments, and
decoding the selected segments.

21. The medium of claim 20, wherein the selecting comprises:
estimating a viewport location at a future time, and
selecting segments according to the estimated viewport location.

22. The medium of claim 20, wherein the selecting comprises, when the manifest file identifies different tiers of service for the multi-view video,
selecting a segment corresponding to an estimated viewport location at a first level of service, and
selecting another segment that does not correspond to the estimated viewport at a second, tier of service lower than the first tier of service.

23. The medium of claim 20, wherein the selecting comprises, when the manifest file identifies different tiers of service for the multi-view video,
selecting segments of a first tile corresponding to an estimated viewport location including a first segment containing a base-layer coded representation of the tile and a second segment containing an enhancement-layer coded representation of the tile, and
selecting a segment of a second tile that does not correspond to the estimated viewport containing a base-layer coded representation of the second tile.

24. The medium of claim 20, wherein the selecting comprises, when the manifest file identifies different tiers of service for the multi-view video,
estimating a first viewport location at a prefetch time, and selecting first quality representation of segments according to the first estimated viewport location, and
estimating a second viewport location at a later time, and selecting a second quality representation of segments according to the second estimated viewport location.

25. A player device, comprising:
storage for a plurality of downloadable segments of a multi-view video;
a video decoder having an input for segments in storage;
a display for display of decoded segment data; and
a controller that
retrieves from a network a manifest file identifying a plurality of segments of a multi-view video available for download and tiles representing spatial areas of the multi-view video to which each segment corresponds, wherein the tiles are at sizes determined based on saliency of the content within their respective spatial areas, selects, from the tiles identified in the manifest file, segment(s) to be rendered, and retrieves from the network the selected segments according to network locations identified in the manifest file for the segments.

* * * * *